United States Patent
Bruno et al.

[11] Patent Number: 5,991,380
[45] Date of Patent: Nov. 23, 1999

[54] UNIVERSAL TELECOMMUNICATIONS SERVICES ACCOUNT

[75] Inventors: Barbara B. Bruno; Richard Frank Bruno, both of Morristown; Howard Paul Katseff, Englishtown; Robert Edward Markowitz, Glen Rock; Bethany Scott Robinson, Lebanon, all of N.J.

[73] Assignee: AT&T Corp., New York, N.Y.

[21] Appl. No.: 08/955,840

[22] Filed: Oct. 21, 1997

[51] Int. Cl.⁶ .................................................. H04M 15/00
[52] U.S. Cl. ................ 379/115; 379/144; 379/91.01; 705/26; 705/39; 235/380
[58] Field of Search ................................. 379/112, 114, 379/115, 120, 121, 127, 144, 91.01, 91.02; 705/11, 17, 18, 39, 40, 26; 235/380, 382

[56] References Cited

U.S. PATENT DOCUMENTS

| | | | |
|---|---|---|---|
| 5,621,787 | 4/1997 | McKoy et al. | 379/144 |
| 5,771,282 | 6/1998 | Friedes | 379/114 |
| 5,844,972 | 12/1998 | Jagadish et al. | 379/144 |

FOREIGN PATENT DOCUMENTS 97-01920   1/1997   WIPO .

Primary Examiner—Paul Loomis

[57] ABSTRACT

A method and a system for accumulating charges for telecommunications services used during a calling card call, whether the calling card is periodically billed or prepaid. According to the invention, call information detail information, such as a user identification, a beginning time of the call, and setup parameters of the call, is received for a calling-card call. Services rate information is received for telecommunications services used during the calling-card call. A depletion rate of an available funds account associated with the calling-card call is then determined in real time, and the available funds account is depleted at the determined depletion rate during the calling-card call, also in real time.

48 Claims, 2 Drawing Sheets

5,991,380

UNIVERSAL TELECOMMUNICATIONS SERVICES ACCOUNT

BACKGROUND OF THE INVENTION

1. Field of the Invention

The present invention relates to the field of telecommunications. More particularly, the present invention relates to a method and a system for charging telecommunications services to a calling account.

2. Description of the Related Art

Conventional calling cards, whether periodically billed or prepaid, provide the same service to each cardholder of a particular card, that is, each cardholder of a particular calling card receives the same type of service that other cardholders of the same card receive. If a particular calling card is for long distance service, all cardholders of that card receive only long distance toll service. If a cardholder makes a long distance call originating from a cellular phone, only the long distance charges will be charged to the calling card account. Any charges associated with air time for the cellular service is billed to the subscriber of the equipment from which the call originates.

What is needed is a way to record charges for services used by a calling card user, whether the calling card is periodically billed or prepaid, so that charges for actual services used by the cardholder accrue against the calling card account.

SUMMARY OF THE INVENTION

The present invention provides a method and a system for recording charges for services used by a calling card user in real time so that charges for actual services used by the cardholder accrue against the calling card account. The advantages of the present invention are provided by a method and a system for accumulating charges for telecommunications services used during a calling card call, whether the calling card is periodically billed or prepaid. According to the invention, call detail information, such as a user identification, a beginning time of the call, and setup parameters of the call, is received for a calling-card call. Services rate information is received for telecommunications services used during the calling-card call. A depletion rate of an available funds account associated with the calling-card call is then determined in real time, and the available funds account is depleted at the determined depletion rate during the calling-card call, also in real time. Preferably, the services rate information can include information about a calling plan to which a caller of the calling-card call subscribes, long distance toll rate information, cellular-type service air time rate information, and service rates for Internet provider services.

BRIEF DESCRIPTION OF THE DRAWING

The present invention is illustrated by way of example and not limitation in the accompanying figures in which like reference numerals indicate similar elements and in which.

DETAILED DESCRIPTION

The present invention provides a method and a system for recording charges for services used by a calling card user, whether the calling card is periodically billed or prepaid, in real time so that charges for actual services used by the cardholder accrue against the calling card account. That is, the present invention provides a method and a system using a universal-type calling card account for accruing charges for telecommunications services in real time, regardless of the particular type of service used, and regardless of the type of calling card used. That is, the present invention is applicable for calling cards that are periodically billed, such as each month, prepaid calling cards and virtual calling card accounts that are periodically billed or are prepaid. A virtual calling card account is a calling transaction account in which no physical card has been issued, but a subscriber can be readily identified with an account by either association in a well-known manner with, for example, call set up information, a personal identification number (PIN) and/or an electronic identification number (EIN). Further, the present invention can be customized for each cardholder so that specific calling plans subscribed to by a cardholder are accounted for as charges accrue against the calling card account.

Figure 1:
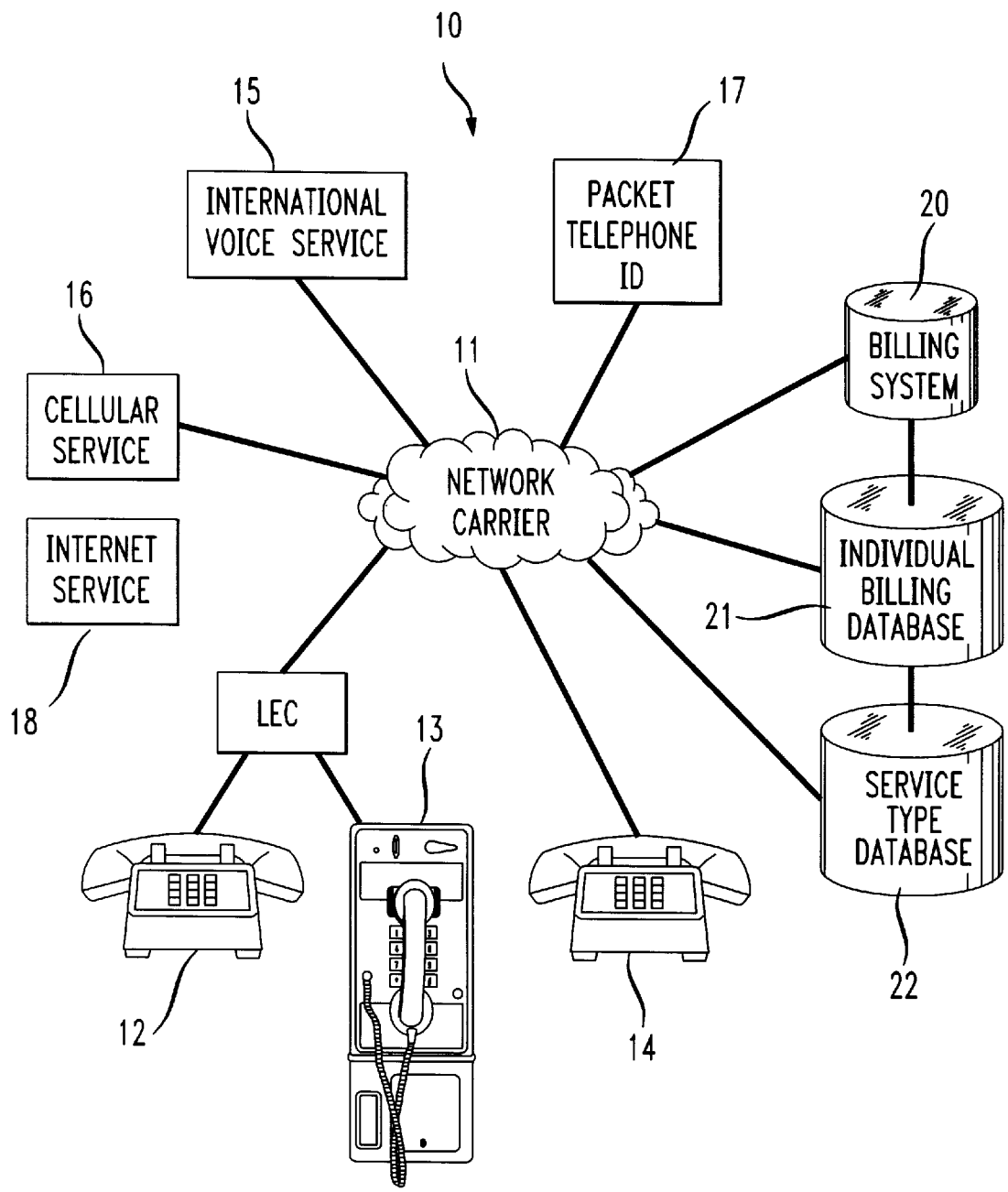
FIG. 1 shows a block diagram of a telecommunications system that utilizes a calling card according to the present invention.

FIG. 1 shows a block diagram of a telecommunications system 10 in which a network carrier 11 provides access to telecommunications services, such as standard voice services via standard phones 12 and 13, and pay phone 14, international voice service 15, cellular service 16, packet telephone service 17 and Internet service 18. Standard voice services provided by network carrier 11, such as plain old telephone service (POTS), long distance services, voice-messaging services, "toll-free" 800 services, and "900" services, are accessed either through a Local Exchange Carrier (LEC) in a well-known manner, or by direct connection to network carrier 11.

Network carrier 11 includes a billing system 20, an individual billing database 21 and a service type database 22. Billing system 20 receives and accumulates billing information from the different platforms providing the different services offered by network 11 for generating service detail records in real time for each calling card account. "Real time", as used herein, means simultaneous with an occurrence of a telecommunications service transaction that incurs a charge, or within a relatively short period of time after the occurrence of a service transaction incurring a charge.

Individual billing database 21 stores rate information regarding billing plans each network subscriber subscribes to, such as calling plans, SDN, etc, whether the subscriber is an individual or a business. Service type database 22 stores rate information for services that can be accessed from network carrier 11 that are provided by service providers other than network carrier 11, such as Internet voice and data services. Billing system 20, individual billing database 21 and service type database 22 are interconnected so that queries between each platform can be performed in a well-known manner. Additionally, billing system 20, individual billing database 21 and service type database 22 can each be distributed platforms located remotely from each other, be separate platforms at a central location, or be integrated into a single platform at a central location.

Figure 2:
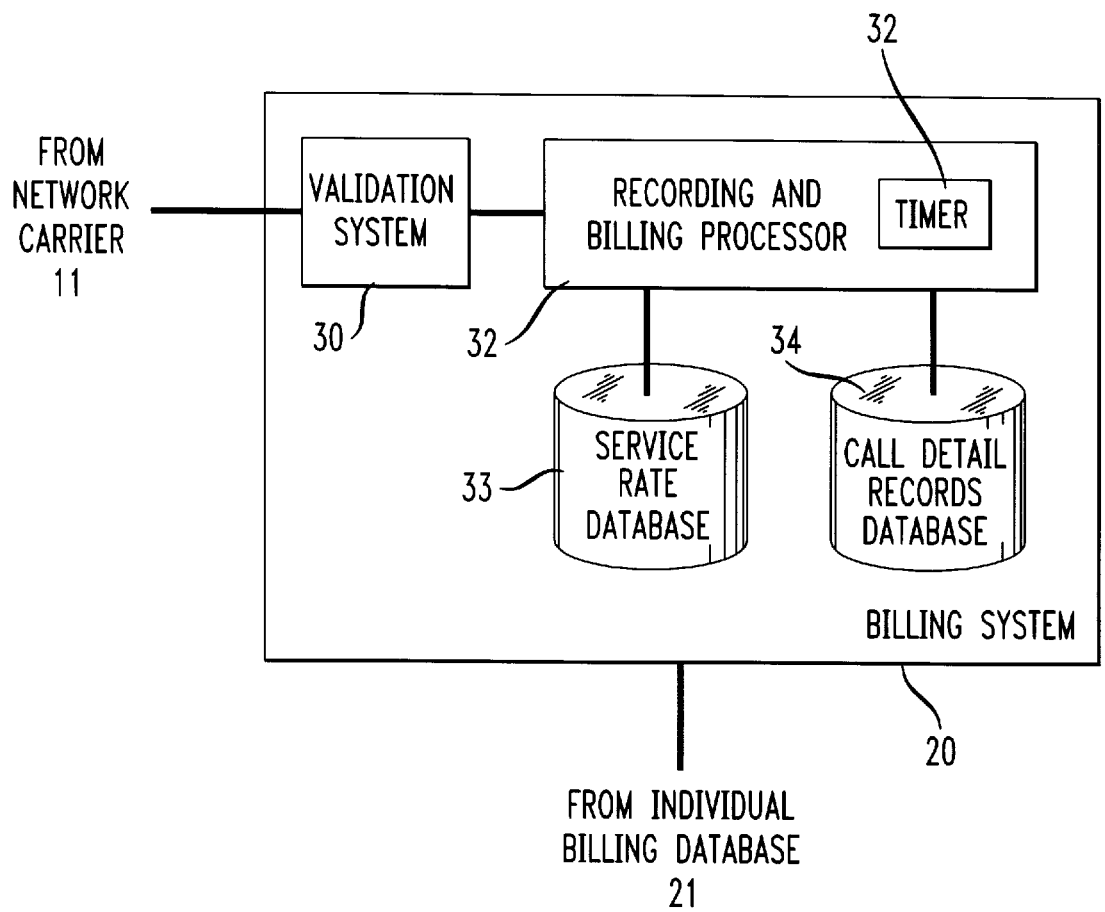
FIG. 2 is a schematic block diagram showing details of billing system according to the present invention.

FIG. 2 is a schematic block diagram showing details of billing system 20. Billing system 20 includes a calling-card validation system 30, a recording and billing processor 31, a service rate database 33 and a call detail records database 34. Calling-card validation system 30 validates calling card accounts in a well-known manner when a user using a calling card account accesses network carrier 11. While FIG. 2 shows calling-card validation system 30 as part of billing system 20, calling-card validation system 30 can be remotely located from billing system 20. Recording and billing processor 31 includes a timer 32 for timing each calling-card call. Service rate database 33 stores current billing rate information for on-going calls using calling cards. Call detail records database 34 stores billing records relating to calling card accounts for completed calls. Inventory control of the calling cards for a particular business can be performed by on-line access and analysis of the information stored in call detail records database 34 in a well-known manner.

When a user accesses network carrier 11 using a calling card account, the card account information is validated in a well-known manner by calling-card validation platform 30. Once a calling-card account has been validated, recording and billing processor 31 determines in a well-known manner whether the calling-card account has sufficient funds for initiating a call. If the account has sufficient funds, the call is allowed to proceed and billing system 20 receives call detail information in real time from platforms providing the particular service(s) requested by the calling card user, such as user identification, the beginning time of the call, the setup parameters of the call, and any additional information that is relevant for billing the particular service accessed. The call detail information is processed by recording and billing processor 31, which accesses individual billing information from individual billing database 21 in a well-known manner, for obtaining appropriate billing rates for calling plans a particular subscriber subscribes to, such as business or residential type calling plans. Record and billing processor 31 also accesses service rate information stored in service type database 22 in a well-known manner for obtaining rate information for services that are provided by service providers other than network carrier 11. Current information obtained from databases 22 and 23 is stored in service rate database 32 for access by recording and billing processor 31 as call information is received.

The call detail information received by billing system 20 for a particular calling-card call account is accrued against the funds account for the card so that the complete charges for the call monitored recorded. As the call is connected, billing system 20 keeps track of the time of the call and debits the calling-card account balance used for the call as the call proceeds in real time. For example, if a call is made from a cellular-type service to an Internet website for accessing data, the air time associated with the cellular call based on the particular subscriber's billing structure plus the charges for the Internet data service are debited against the account at their respective service rates. Accordingly, different rates can be charged for accesses to different types of data. For example, video and graphic information can incur one charge rate, while audio information can incur another rate. Charges to 900 numbers can also be recorded and accrued by the present invention.

When the calling card account is a prepaid calling card account the funds account associated with the card is an available funds account. The present invention continually checks the account against a sufficient funds threshold as charges against a particular account are recorded. When available funds in the account fall below the sufficient funds threshold, the present invention sends a message to the user in a well-known manner informing the user of the account status with an estimated amount of time remaining at the current rate that the account is being depleted. When the call is a voice-type service call, billing system 20 notifies the user by, for example, generating an audio message in a well-known manner that is played for the user, or by sending an email message or a facsimile message to the user in a well-known manner. When the call is a multimedia-type service call, billing system 20 generates a message in a well-known manner that is suitable for the multimedia-type service call. The user can, after receiving the notification message, have money placed into the available funds account for the calling card through a credit card transaction and be validated on-line in a well-known manner. As a separate option, money can automatically be transferred to the card in a well-known manner once the balance of the available funds account drops below a predetermined amount.

While the present invention has been described in connection with the illustrated embodiments, it will be appreciated and understood that modifications may be made without departing from the true spirit and scope of the invention.

What is claimed is:

1. A method for accumulating charges for telecommunications services used during a calling card call placed by a cardholder using a calling-card, the method comprising the steps of:

receiving call detail information for a calling-card call, the calling card call using telecommunications services including telecommunications services other than connection of the calling-card call;

receiving services rate information for telecommunications services used during the calling-card call, the services rate information including information relating to specific calling plans subscribed to by the cardholder relating to connection of the calling-card call and relating to the telecommunications services other than connection of the calling-card call;

determining a charges accruing rate for a funds account associated with the calling-card call based on the received call detail information and the specific calling plan information for the connection of the calling-card call and the telecommunications services other than connection of the calling-card call;

accruing charges for the funds account at the determined charges accruing rate during the calling-card call, the accrued charges including charges for the connection of the calling-card call and the telecommunications services other than connection of the calling-card call.

2. The method according to claim 1, wherein the step of determining a charges accruing rate and the step of accruing charges for funds account both occur in real time.

3. The method according to claim 2, wherein the call detail information includes at least one of a user identification, a beginning time of the call, and a setup parameter of the call.

4. The method according to claim 2, wherein the services rate information includes information about a calling plan to which a caller of the calling-card call subscribes.

5. The method according to claim 2, wherein services rate information includes at least one of long distance toll rate information and cellular-type service air time rate information.

6. The method according to claim 2, wherein services rate information includes telecommunications service rates for Internet provider services.

7. The method according to claim 2, wherein the calling card is billed periodically.

8. The method according to claim 2, wherein the calling card is a prepaid calling card.

9. The method according to claim 8, wherein the calling card is a virtual calling card.

10. The method according to claim 8, wherein the funds account is an available funds associated with the prepaid calling-card call, wherein the step of determining a charges accruing rate includes the step of determining a depletion rate for the available funds account associated with the prepaid calling card based on the received call detail information and the services rate information, and wherein the step of accruing charges includes the step of depleting the available funds account at the determined depletion rate during the calling-card call, the method further comprising the step of validating the available funds account associated with the prepaid calling-card call before the step of receiving call information detail information for the prepaid calling-card call.

11. The method according to claim 10, further comprising the step of notifying a caller of the prepaid calling-card call when a funds balance in the available funds account is less than a predetermined funds threshold amount.

12. The method according to claim 11, wherein the step of notifying the caller includes the step of generating an audio message for the caller.

13. The method according to claim 11, wherein the step of notifying the caller includes the step of sending an email message to the caller.

14. The method according to claim 11, wherein the step of notifying the caller includes the step of sending a facsimile message to the caller.

15. The method according to claim 11, further comprising the step of increasing the funds balance in the available funds account by a credit card transaction.

16. The method according to claim 11, further comprising the step of increasing the funds balance in the available funds account by an automatic funds transfer to the available funds account.

17. A system for accumulating charges for telecommunications services used during a calling card call placed by a cardholder using a calling-card, the system comprising:

a database storing billing rate information for predetermined telecommunications services, the billing rate information including information relating to specific calling plans subscribed to by the cardholder relating to connection of the calling-card call and relating to telecommunications services other than connection of the calling-card call;

a billing processor, coupled to the database, receiving call detail information for a calling-card call, the calling card call using telecommunications services including telecommunications services other than connection of the calling-card call, the billing processor determining a charges accruing rate of a funds account associated with the calling-card call based on the received call detail information and the specific calling plan information for the connection of the calling-card call and the telecommunications services other than connection of the calling-card call that are stored in the database, and accruing charges for the funds account at the determined charges accruing rate during the calling-card call, the accrued charges including charges for the connection of the calling-card call and the telecommunications services other than connection of the calling-card call.

18. The system according to claim 17, wherein the billing processor determines the charges accruing rate and accrues the charges for the funds account both in real time.

19. The system according to claim 18, wherein the call detail information includes at least one of a user identification, a beginning time of the call, and a setup parameter of the call.

20. The system according to claim 18, wherein the billing rate information stored in the database include service rate information for Internet telecommunications services.

21. The system according to claim 18, wherein the billing rate information stored in the database include a billing rate for a calling plan subscribed to by a caller of the calling-card call.

22. The system according to claim 18, wherein the billing rate information includes at least one of long distance toll rate information and cellular-type service air time rate information.

23. The system according to claim 22, wherein the calling card is billed periodically.

24. The system according to claim 22, wherein the calling card is a prepaid calling card.

25. The system according to claim 24, wherein the calling card is a virtual calling card.

26. The system according to claim 24, wherein the funds account is an available funds account associated with the prepaid calling card, wherein the billing processor determines a depletion rate for the available funds account associated with the prepaid calling card based on the received call detail information and the services rate information, and wherein the billing processor depletes the available funds account at the determined depletion rate during the calling-card call, the billing processor further validating the available funds account associated with the prepaid calling-card call before receiving call information detail information for the prepaid calling-card call.

27. The system according to claim 26, wherein the billing processor notifies a caller of the prepaid calling-card call when a funds balance in the available funds account is less than a predetermined funds threshold amount.

28. The system according to claim 27, wherein the billing processor notifies the caller by generating an audio message for the caller.

29. The system according to claim 27, wherein the billing processor notifies the caller by sending an email message to the caller.

30. The system according to claim 27, wherein the billing processor notifies the caller by sending a facsimile message to the caller.

31. The system according to claim 27, wherein the billing processor increases the funds balance in the available funds account by a credit card transaction.

32. The system according to claim 27, wherein the billing processor increases the funds balance in the available funds account by an automatic funds transfer to the available funds account.

33. A method for accumulating charges for telecommunications services used during a calling card call placed by a cardholder using a calling-card, the method comprising the steps of:

recording call detail information for a calling-card call, the calling card call using telecommunications services including telecommunications services other than connection of the calling-card call;

associating services rate information with telecommunications services used by the calling-card call, the services rate information including information relating to specific calling plans subscribed to by the cardholder relating to connection of the calling-card call and relating to the telecommunications services other than connection of the calling-card call;

determining a charges accruing rate for a funds account associated with the calling-card call based on the recorded call detail information and the specific calling plan information for the connection of the calling-card call and the telecommunications services other than connection of the calling-card call;

accruing charges for the funds account at the determined charges accruing rate during the calling-card call, the accrued charges including charges for the connection of the calling-card call and the telecommunications services other than connection of the calling-card call.

34. The method according to claim 33, wherein the step of determining a charges accruing rate and the step of accruing charges for funds account both occur in real time.

35. The method according to claim 34, wherein the call detail information includes at least one of a user identification, a beginning time of the call, and a setup parameter of the call.

36. The method according to claim 34, wherein the services rate information includes information about a calling plan to which a caller of the calling-card call subscribes.

37. The method according to claim 34, wherein services rate information includes at least one of long distance toll rate information and cellular-type service air time rate information.

38. The method according to claim 34, wherein services rate information includes telecommunications service rates for Internet provider services.

39. The method according to claim 34, wherein the calling card is billed periodically.

40. The method according to claim 34, wherein the calling card is a prepaid calling card.

41. The method according to claim 40, wherein the calling card is a virtual calling card.

42. The method according to claim 40, wherein the funds account is an available funds associated with the prepaid calling-card call, wherein the step of determining a charges accruing rate includes the step of determining a depletion rate for the available funds account associated with the prepaid calling card based on the received call detail information and the services rate information, and wherein the step of accruing charges includes the step of depleting the available funds account at the determined depletion rate during the calling-card call, the method further comprising the step of validating the available funds account associated with the prepaid calling-card call before the step of receiving call information detail information for the prepaid calling-card call.

43. The method according to claim 42, further comprising the step of notifying a caller of the prepaid calling-card call when a funds balance in the available funds account is less than a predetermined funds threshold amount.

44. The method according to claim 43, wherein the step of notifying the caller includes the step of generating an audio message for the caller.

45. The method according to claim 43, wherein the step of notifying the caller includes the step of sending an email message to the caller.

46. The method according to claim 43, wherein the step of notifying the caller includes the step of sending a facsimile message to the caller.

47. The method according to claim 43, further comprising the step of increasing the funds balance in the available funds account by a credit card transaction.

48. The method according to claim 43, further comprising the step of increasing the funds balance in the available funds account by an automatic funds transfer to the available funds account.

* * * * *